US009705500B2

(12) United States Patent
Annunziata et al.

(10) Patent No.: US 9,705,500 B2
(45) Date of Patent: Jul. 11, 2017

(54) MAGNETIC TUNNEL JUNCTION BASED CHIP IDENTIFICATION

(71) Applicant: International Business Machines Corporation, Armonk, NY (US)

(72) Inventors: Anthony J. Annunziata, Stamford, CT (US); Chandrasekharan Kothandaraman, New York, NY (US); Philip L. Trouilloud, Norwood, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/285,900

(22) Filed: Oct. 5, 2016

(65) Prior Publication Data

US 2017/0170827 A1    Jun. 15, 2017

Related U.S. Application Data

(63) Continuation of application No. 14/969,282, filed on Dec. 15, 2015, now Pat. No. 9,495,627.

(51) Int. Cl.
*G11C 11/00* (2006.01)
*H03K 19/003* (2006.01)
*G11C 11/16* (2006.01)

(52) U.S. Cl.
CPC .......... *H03K 19/003* (2013.01); *G11C 11/161* (2013.01); *G11C 11/1673* (2013.01)

(58) Field of Classification Search
CPC .. H03K 19/003; G11C 11/161; G11C 11/1673

USPC .......................................................... 365/158
See application file for complete search history.

(56) References Cited

U.S. PATENT DOCUMENTS

| | | | | |
|---|---|---|---|---|
| 6,385,079 | B1 * | 5/2002 | Tran | G11C 11/15 365/148 |
| 6,587,371 | B1 * | 7/2003 | Hidaka | G11C 11/15 365/158 |
| 6,590,803 | B2 * | 7/2003 | Saito | G11C 11/16 365/158 |
| 7,164,599 | B2 * | 1/2007 | Hosotani | G11C 11/15 365/158 |
| 7,948,044 | B2 * | 5/2011 | Horng | H01L 43/08 257/295 |
| 8,057,925 | B2 * | 11/2011 | Horng | G01R 33/098 365/158 |

(Continued)

*Primary Examiner* — Viet Q Nguyen
(74) *Attorney, Agent, or Firm* — Cantor Colburn LLP; Vazken Alexanian

(57) ABSTRACT

The present invention provides integrated circuit chips having chip identification aspects. The chips include magnetic tunnel junction (MTJ) structures, and more specifically, include permanent bit strings used for chip identification and/or authentication. Systems and processes for chip identification are also disclosed herein. The MTJ element structures provided herein can have a defined resistance profile such that the intrinsic variability of the MTJ element structure is used to encode and generate a bit string that becomes a fingerprint for the chip. In some embodiments, an oxygen treatment covering all or a selected portion of an array of MTJ elements can be used to create a mask or secret key that can be used and implemented to enhance chip identification.

12 Claims, 6 Drawing Sheets

(56) References Cited

U.S. PATENT DOCUMENTS

| | | | |
|---|---|---|---|
| 8,804,398 B2* | 8/2014 | Chung | G11C 17/06 257/2 |
| 9,025,371 B1* | 5/2015 | Huai | B82Y 10/00 365/148 |
| 9,495,627 B1* | 11/2016 | Annunziata | G06K 19/06196 |
| 2006/0013039 A1* | 1/2006 | Braun | G11C 11/15 365/171 |
| 2007/0097736 A1* | 5/2007 | Inokuchi | G11C 11/16 365/158 |
| 2014/0071744 A1* | 3/2014 | Lee | G11C 11/1673 365/158 |

* cited by examiner

MAGNETIC TUNNEL JUNCTION BASED CHIP IDENTIFICATION

DOMESTIC PRIORITY

This application is a continuation of and claims priority to U.S. Nonprovisional application Ser. No. 14/969,282 entitled Magnetic Tunnel Junction Based Chip Identification filed Dec. 15, 2015, which is incorporated herein by reference in its entirety.

BACKGROUND

The present invention generally relates to magnetic tunnel junction (MTJ) structures, and more specifically, to magnetic tunnel junction structures configured for integrated chip (IC) identification.

Integrated circuit (IC) chip cloning and counterfeiting are recurrent issues in many areas, and in particular, in the area of semiconductors. These issues can cost billions of dollars in revenue. Used chips are often still functional and are reused and resold after de-soldering, thereby putting the chips back into the supply chain. Such practices can pose reliability and security risks. In addition, the chips can be cloned or copied, thereby posing additional security risks. Companies often do not report counterfeit chips when they find them. Moreover, some of the reused chips can be found in military hardware, further imposing significant security risks and exposure.

Current methods of integrated circuit (IC) chip identification include eFUSE devices. Such devices are currently used in consumer parts to "mark" chips. eFUSE devices store a bit string that is authenticated at "power on". eFUSE can be easily visible with routine inspection techniques. In some instances, the marking or the unique bit string can be easily read, imaged and copied many times. Accordingly, chips with eFUSE and other conventional means of authentication can be easily cloned and may pose security issues.

Other technologies include static random access memory (SRAM) based identification systems. The power-up of the SRAM cell depends on the Vt fluctuation which can be used to generate a unique bit string. It is, however, not stable over time, voltage and temperature.

Accordingly, there remains a need for more reliable and secure identification and authentication for greater security in the global supply chain of integrated circuit (IC) chips.

SUMMARY

The present invention recognizes that magnetic tunnel junction (MTJ) elements or devices using such MTJs (such as magnetoresistive random access memory (MRAM) devices) have unique tunneling characteristics that are not easily reproduced. The characteristics of the MTJ elements can be used to form a unique fingerprint for a device that can be used to form chip identification. This identification can be easily read, but cannot be reproduced as it depends on the stochastics of the formation of each junction that forms an array of MTJ elements. The present invention thus uses magnetic tunnel junction (MTJ) elements to prevent chip cloning while providing sufficient uniqueness in the form of a fingerprint for the array and hence device. Because the pattern is unique and not reproducible, even from die to die, the uniqueness can be further enhanced with the structures and processes disclosed herein.

In an embodiment of the present invention, an array of magnetic tunnel junction (MTJ) elements is configured for identification. The array includes: a plurality of magnetic tunnel junction (MTJ) elements, each MTJ element including a first magnetic layer, a second magnetic layer and a non-magnetic layer positioned between the first and second magnetic layers; and sense circuitry electrically connected to the plurality of MTJ elements, the sense circuitry configured to generate resistance data for the plurality of MTJ elements relative to reference data.

In another embodiment of the present invention, a method for generating a fingerprint for an array of a plurality of MTJ elements includes sensing a first MTJ element by subjecting the first MTJ element in the plurality of MTJ elements to a voltage to generate data for the first element in the plurality of the MTJ elements relative to a first reference data and provide a first sensed MTJ element; sensing a second MTJ element by subjecting the second MTJ element in the plurality of MTJ elements to a voltage to generate data for the second element in the plurality of the MTJ elements relative to a second reference data and provide a second sensed MTJ element; continuing to sequentially sense a predetermined number of MTJ elements in the array of the plurality of MTJ elements by sequentially subjecting subsequent MTJ elements in the array of the plurality of MTJ elements to a voltage to generate data for the subsequent MTJ elements in the array of the plurality of MTJ elements relative to a respective sequential reference data for each of the MTJ elements being sensed and provide a predetermined number of sensed MTJ elements; and collecting the generated data for the sensed MTJ elements to generate a permanent string of the data associated with the array of the MTJ elements.

In yet another embodiment of the present invention, a method for identifying a memory device includes reading a bit string from a chip in the device; comparing the read bit string to a permanent bit string; and determining if the read bit string and permanent bit string are the same.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
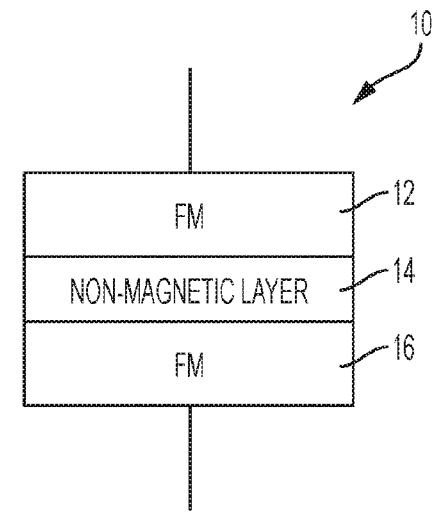
FIG. 1 illustrates a magnetic tunnel junction (MTJ) element.

As stated above, the present invention relates to magnetic tunnel junction (MTJ) structures, and more specifically, to magnetic tunnel junction structures configured for integrated chip (IC) identification, which are now described in detail with accompanying figures. It is noted that like reference numerals refer to like elements across different embodiments.

The MTJ structures provided herein can have a defined resistance profile such that the intrinsic variability of the MTJ structure is used to encode a bit string and form a permanent string (i.e., fingerprint) that can be used for chip identification, and optionally, for authentication purposes. In some embodiments, an oxygen treatment covering all or only a portion of the chip provides enhanced fingerprinting capabilities to store a secret key can be used and implemented in accordance with the present invention.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

Accordingly, disclosed herein are arrays of magnetic tunnel junctions that are used to provide chips having unique chip identification characteristics (i.e., fingerprints). The inventive structures, as described below, more specifically include an array of MTJs and sense circuitry coupled to the MTJs. Each MTJ includes a magnetic layer such as a ferromagnetic layer, a non-magnetic insulator layer and a second magnetic layer such as a ferromagnetic layer. The sense circuitry can compare the resistance of a given MTJ in the array to a standard reference or a less variable MTJ to generate a unique pattern or fingerprint. The resistance data of the array is recorded and used as a permanent string. The structures and methods described in the various embodiments are described in detail below.

As used herein, "sense circuitry" means circuitry that can be used to generate data regarding magnetic tunnel junction (MTJ) elements in a manner that allows characterization of an array of MTJ elements to generate and provide a bit pattern or fingerprint for a given array of MTJ elements or portion of an array of MTJ elements. While not to be construed as limiting, "sense circuitry" includes both single ended sensing sense circuitry and differential sensing sense circuitry.

As used herein, "single ended sensing" means applying a voltage to a specified MTJ and comparing the applied voltage or current flowing through a given MTJ against a respective referenced voltage or current value. "Single ended sensing" can refer to single ended sensing of one MTJ element, to an array of MTJ elements and/or to a portion of an array of MTJ elements. Such array of MTJ elements can be part of a chip that forms a MRAM memory device or other memory device. "Single ended sensing" uses unique tunneling current flowing through a MTJ element to provide resistance data that is unique for the MTJ element. "Single ended sensing" can use raw resistance data and modeling of the data within a predetermined noise range to assign a value of "0" or "1" for the MTJ element relative to the reference value for the MTJ element being sensed. If a value of a MTJ element is within a predetermined range of the reference value, the MTJ element can be assigned a value of "indeterminant". "Single ended sensing sense circuitry" refers to circuitry for "single ended sensing".

As used herein, "differential sensing" means utilizing a reference MTJ value compared to a MTJ value being assessed. The reference MTJ value will be a MTJ element having less variability relative to the MTJ element being sensed or assessed (i.e. a MTJ element having more variability relative to the reference MTJ element). For example, a reference MTJ element may have a larger size than the MTJ element being sensed or assessed. A reference MTJ element can alternatively or in addition be a reference MTJ element that has not been subjected to an oxygen treatment as provided herein. In either case, the reference MTJ element has less resistance variability than the MTJ element being sensed or assessed. Data from comparison of the MTJ element being sensed or assessed relative to the reference MTJ element allows for generation of the bit pattern of the array of MTJ elements being sensed or assessed. The bit pattern can then be stored as a permanent string for use as a chip identification. "Differential sensing" includes applying a voltage to a specified MTJ element and comparing the applied voltage or current flowing through the MTJ element against that of the reference MTJ element for the MTJ element being sensed or assessed. "Differential sensing" can refer to differential sensing of one MTJ element, an array of MTJ elements, and/or to a portion of an array of MTJ elements. Such array of MTJ elements can be part of a chip that forms a MRAM memory device or other memory device. "Differential sensing" uses unique tunneling current flowing through a MTJ element to provide a resistance that is also unique for the MTJ element. "Differential sensing" can use raw resistance data and modeling of the data within a predetermined noise range to assign a value of "0" or "1" for the MTJ element relative to the value of the reference MTJ element. If a value of a MTJ element is within a predetermined range of the reference MTJ element, the MTJ element being assessed can be assigned a value of "indeterminate". "Differential sensing sense circuitry" refers to circuitry for "differential sensing".

FIG. 1 illustrates a magnetic tunnel junction (MTJ) element 10. As can be seen from FIG. 1, MTJ element 10 includes a first magnetic layer 12, a non-magnetic layer 14, and a second magnetic layer 16. First and second magnetic layers 12, 16 are preferably ferromagnetic layers. Non-magnetic layer 14 is preferably an insulator layer such that current can tunnel between magnetic layers 12, 16. Such MTJ structures are known to those skilled in the art. As also known to those skilled in the art, the structure and number of layers in a MTJ element that is part of a chip or memory device can include additional layers and/or the layers of the MTJ and the chip can be formed from a variety of materials. The present invention is designed to be able to generate a unique pattern or fingerprint for any MTJ element. Details of MTJ structure, process of general MTJ manufacture and/or materials of formation are therefore not included herein.

Figure 2:
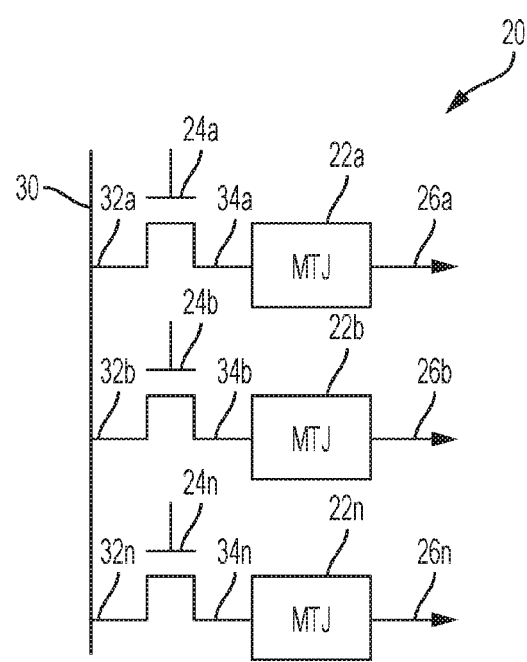
FIG. 2 illustrates an array of MTJ elements configured with sense circuitry to form a unique bit pattern.

FIG. 2 illustrates an array of MTJ elements with sense circuitry to form a unique bit pattern or fingerprint in accordance with the present invention. MTJ array 20 shown in FIG. 2 includes a plurality of magnetic tunnel junction (MTJ) elements 22a, 22b . . . 22n. The number of MTJ elements, and hence size of array 20, can vary depending on the application and the desired chip identification application. MTJ array 20 further includes a plurality of sense circuitry elements or transistors 24a, 24b . . . 24n. The number of sense circuitry elements 24a, 24b . . . 24n will depend on the number of MTJ elements 22a, 22b . . . 22n. Sense circuitry elements 24a, 24b . . . 24n are electrically connected or electrically coupled to MTJ elements 22a, 22b . . . 22n via lines 34a, 34b . . . 34n. As discussed in more detail herein, transistors 24a, 24b . . . 24n are designed to function as switches for MTJ elements 22a, 22b . . . 22n.

As can further be seen from FIG. 2 and as also discussed in more detail herein, transistors 24a, 24b . . . 24n receive input 32a, 32b . . . 32n in the form a voltage from bus 30 that is connected to an amplifier. The output 26a, 26b . . . 26n of MTJ elements 22a, 22b . . . 22n are connected to ground. As mentioned above, various manufacturing processes can be used to make a MTJ element. The MTJ will have a unique tunneling path through non-magnetic layer 14 between magnetic layers 12, 16 of the MTJ element 10 of FIG. 1. The unique tunneling path of the MTJ will thus have unique resistance data associated therewith. An array of MTJ elements has a unique bit pattern or unique fingerprint for each chip, i.e. two arrays will not have the same pattern or fingerprint. As discussed herein, reading the bit pattern in accordance with the present invention is reproducible in the sense that different readouts conducted on the same chip produces the same bit pattern.

Figure 3:
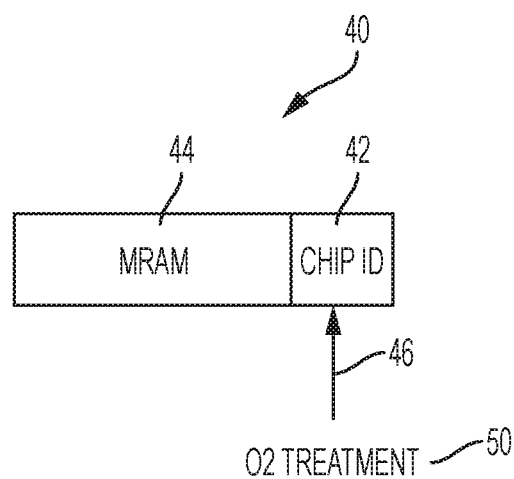
FIG. 3 illustrates an embodiment of the present invention in which a magnetoresistive random access memory (MRAM) device can include a chip identification feature and in which the chip identification feature has optionally been subjected to an oxygen treatment.

Referring now to FIG. 3, device 40 includes a memory device such as MRAM device 44. As can also be seen from FIG. 3, a portion of MRAM device 44 includes chip identification portion 42. Chip identification portion 42 of memory device 44 (such as a MRAM device), both of which are part of memory device 40 includes an array of MTJ elements of predetermined size that has been characterized to include a fingerprint or unique bit pattern for identification purposes. Some or all of chip identification portion 42 of memory device 44 (such as a MRAM device) may optionally have been subjected to oxygen treatment 50 (shown in FIG. 3 via reference numeral 46). Such oxygen treatment is discussed in greater detail herein.

Figure 4:
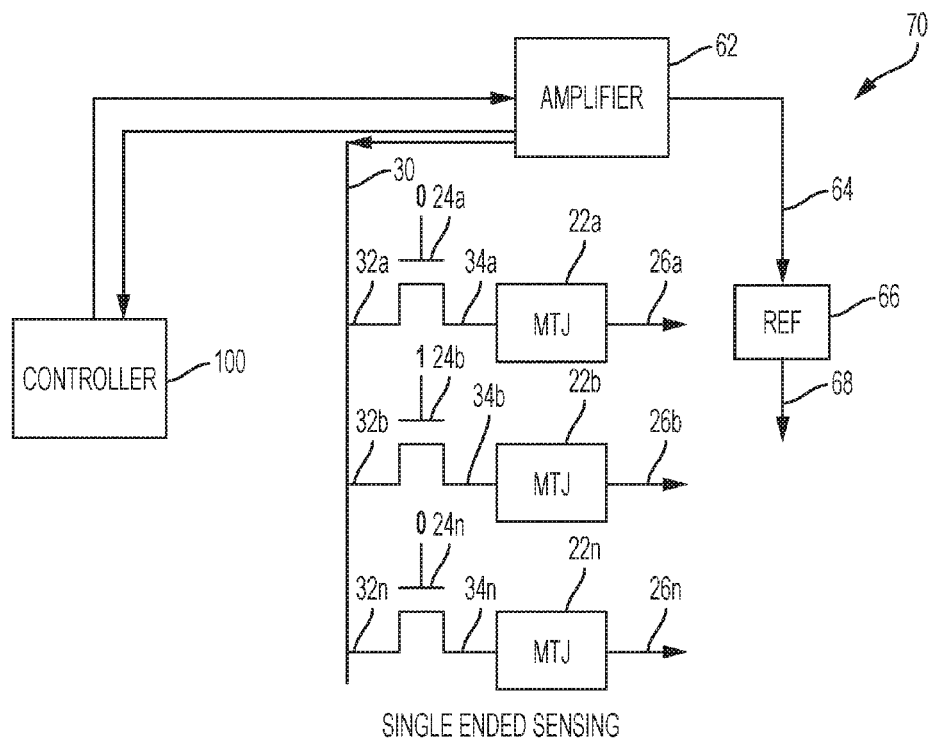
FIG. 4 illustrates an embodiment of the present invention for single ended sensing.
Figure 5:
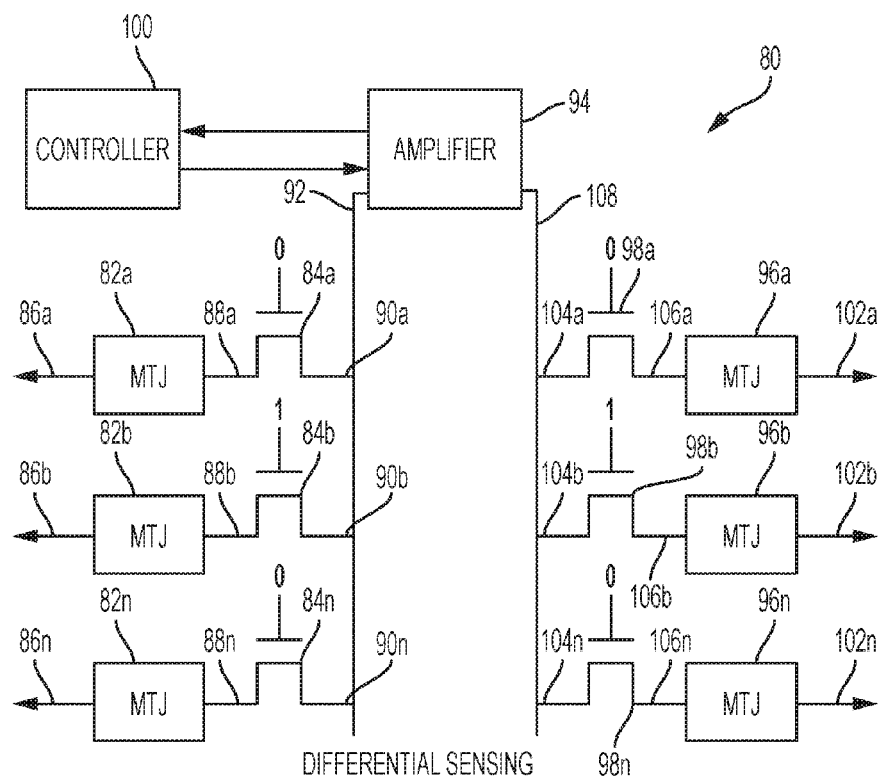
FIG. 5 illustrates an embodiment of the present invention for differential sensing.

FIGS. 4 and 5 illustrate more detailed systems and arrangements for chip identification in accordance with the present invention. FIG. 4 shows an embodiment suitable for single ended sensing in accordance with the present invention while FIG. 5 shows an arrangement suitable for differential sensing in accordance with an alternative embodiment of the present invention. Single ended sensing can be designed to be current based sensing or voltage based sensing. Likewise, differential sensing can be designed to be current based sensing or voltage based sensing. In the single ended mode of sensing, the current flowing through a MTJ element can be compared against the voltage, and hence current, of an external reference value. In the differential mode of sensing, the voltage of a MTJ element can be compared against the voltage, and hence current, applied to a more stable, reference MTJ element rather than an external reference value. In either case, the sensed voltage or current data can be used to generate resistance data of the MTJ element being tested or sensed to provide a sensed MTJ element in the array. The testing can continue in a sequential manner until all or a predetermined number of MTJ elements in the array are sensed. The sensing circuit is preferably robust across the temperature window of operation.

Referring now to FIG. 4, an arrangement 70 for single ended sensing is shown. As discussed above with reference to FIG. 2, arrangement 70 includes an array of MTJ elements with single ended sensing sense circuitry to form a unique bit pattern in accordance with the present invention. The MTJ array shown in FIG. 4 includes a plurality of magnetic tunnel junction (MTJ) elements 22a, 22b . . . 22n. The number of MTJ elements, and hence size of the array, can vary depending on the application and the desired chip identification application. The MTJ array further includes a plurality of sense circuitry elements or transistors 24a, 24b . . . 24n. The number of sense circuitry elements 24a, 24b . . . 24n will depend on the number of MTJ elements 22a, 22b . . . 22n. Sense circuitry elements 24a, 24b . . . 24n are electrically coupled or electrically connected to MTJ elements 22a, 22b . . . 22n via lines 34a, 34b . . . 34n. Transistors 24a, 24b . . . 24n are designed to function as switches for MTJ elements 22a, 22b . . . 22n. The output 26a, 26b . . . 26n of MTJ elements 22a, 22b . . . 22n are connected to ground.

As can further be seen from FIG. 4, transistors 24a, 24b . . . 24n receive input 32a, 32b . . . 32n in the form a voltage from bus 30 that is connected to amplifier 62. Amplifier 62 can be a digital amplifier such as a cross coupled inverter or the like that can be configured to generate output of "0", "1" or "indeterminant" for a given set of data (i.e., for a given MTJ element).

As shown for example in FIG. 4, the values "1" or "0" in connection with transistors 24a, 24b . . . 24n respectively indicate whether the transistor is "on" (meaning that voltage is being received via bus 30 from amplifier 62) or "off" (meaning that voltage is not being received via bus 30 from amplifier 62). Thus for example and as shown in FIG. 4, transistor 24b is "on" and receiving a designated voltage from amplifier 62, while transistors 24a . . . 24n other than transistor 24b are "off". Amplifier 62 generates a reference value 66 via 64 for the MTJ being sensed or tested. Reference 66 is connected to ground via 68. Data output from MTJ element 22b can be received by amplifier 62 via bus 30 and processed by amplifier 62 to generate a value of "0", "1" or "indeterminant" compared to reference value 66. Amplifier 62 is thus configured to compare voltage and/or current through a MTJ element being analyzed or sensed against a given reference value and then assign a value of "0", "1" or "indeterminant" compared to reference value 66.

More specifically, single ended sensing as shown in FIG. 4 allows resistance data for an array of bits or MTJ elements (e.g., 3 shown in FIG. 4) to be collected and analyzed on an individual basis. In other words, by controlling transistors 24a, 24b . . . 24n, each MTJ element can be sensed or analyzed individually and sequentially. The output of each sensed MTJ element can be used in amplifier 62 to generate a fingerprint for the entire MTJ array. More particularly, the present invention provides for generating a string of data for a portion or all of a device such as a MRAM device by sequentially characterizing data for some or all of the MTJ elements in an array.

In accordance with the present invention, all of the MTJs in an entire device (e.g. MRAM device, such as MRAM device 44 shown in FIG. 3) do not necessarily need to be analyzed or sensed to generate a fingerprint for the device. While not to be construed as limiting, a 1 MB device could have 1000 bits be analyzed to generate and store a chip identification or chip fingerprint. The size of the MTJ array that is to be used to generate the fingerprint can be designed depending on the size of the device, the application, the desired identification and the like. For example, it could be desirable for a device requiring enhanced identification for security purposes to have a larger fingerprint or chip identification. In such case, the array that is analyzed could be larger than an array not requiring such identification and/or security.

The values of "0", "1" and "indeterminant" can be determined in various ways. For example, if the output for a given MTJ element has a value greater than the reference value, the MTJ element can have a value of "1" assigned to it. In this scenario, if the output for a given MTJ element has a value less than the reference value, the MTJ element can have a value of "0" assigned to it. If the value of the MTJ element is within a predetermined range of the reference value, then the MTJ element can have a value of "indeterminant" assigned to it. Alternatively, if the output for a given MTJ element has a value greater than the reference value, the MTJ can have a value of "0" assigned to it. In this scenario, if the output for a given MTJ element has a value less than the reference value, the MTJ element can have a value of "1" assigned to it. If the value of the MTJ element is within a predetermined range of the reference value, then the MTJ element can have a value of "indeterminant" assigned to it. A value of a MTJ element within a predetermined range of the reference value in either case can be referred to as a "noise range". The noise range can be determined depending on the application, the array being tested and the like. While not to be construed as limiting and for purposes of illustration only, a reference value could be 1000 ohms and a noise range could be +/−10 ohms. If the MTJ element thus has a value of 990-1010 ohms, the MTJ element could be assigned a value of "indeterminant".

An alternative arrangement for generating a fingerprint using sense circuitry is illustrated in FIG. 5. Arrangement 80 shown in FIG. 5 is designed for differential sensing. As discussed above with reference to FIG. 2, arrangement 80 includes an array of MTJ elements to be sensed with differential sensing sense circuitry to form a unique bit pattern in accordance with the present invention. The MTJ array shown in FIG. 5 includes a plurality of magnetic tunnel junction (MTJ) elements 82a, 82b . . . 82n. The number of MTJ elements, and hence size of the array, can vary depending on the application and the desired chip identification application. The MTJ array further includes a plurality of sense circuitry elements or transistors 84a, 84b . . . 84n. The number of sense circuitry elements 84a, 84b . . . 84n will depend on the number of MTJ elements 82a, 82b . . . 82n. Sense circuitry elements 84a, 84b . . . 84n are electrically coupled or electrically connected to MTJ elements 82a, 82b . . . 82n via lines 88a, 88b . . . 88n. Transistors 84a, 84b . . . 84n are designed to function as switches for MTJ elements 82a, 82b . . . 82n. Output 86a, 86b . . . 86n of MTJ elements 82a, 82b . . . 82n are connected to ground.

As can further be seen from FIG. 5, transistors 84a, 84b . . . 84n receive input 90a, 90b . . . 90n in the form a voltage from bus 92 that is connected to amplifier 94. Amplifier 94 can be a digital amplifier such as a cross coupled inverter or the like that can be configured to generate output of "0", "1" or "indeterminant" for a given set of data.

As can further be seen from FIG. 5, arrangement 80 includes a second array of MTJ elements 96a, 96b . . . 96n coupled to sense circuitry elements or transistors 98a, 98b . . . 98n via 106a, 106b . . . 106n. Reference MTJ elements 96a, 96b . . . 96n and sense circuitry elements or transistors 98a, 98b . . . 98n are configured to generate reference data that is to be compared to the MTJ data of MTJ elements 82a, 82b . . . 82n.

More specifically, reference MTJ elements 96a, 96b . . . 96n have less variability than their respective MTJ elements 82a, 82b . . . 82n. For example, reference MTJ elements 96a, 96b . . . 96n may be larger diameter MTJ elements than their respective MTJ elements 82a, 82b . . . 82n as relatively larger MTJ elements can have less variability. In addition or alternatively, reference MTJ elements 96a, 96b . . . 96n may not have been subjected to an oxygen treatment (as discussed herein), which could also lead to less variability.

Accordingly, the arrangement shown in FIG. 5 for differential sensing can be more robust or reliable than the arrangement shown in FIG. 4 as resistance wiring and variability of the embodiment shown in FIG. 4 can be further reduced or eliminated. The embodiment illustrated in FIG. 5 uses two MTJ elements for each bit to be analyzed, thereby making it potentially more costly and potentially requiring more space for analysis than the embodiment shown in FIG. 4. In some circumstances, however, the increased robustness or reliability may offset such considerations.

Sense circuitry elements or transistors 98a, 98b . . . 98n receive input 104a, 104b . . . 104n in the form a voltage from bus 108 that is connected to amplifier 94. Amplifier 94 can be a digital amplifier such as a cross coupled inverter or the like that can be configured to generate output of "0", "1" or "indeterminant" for a given set of data. Output 102a, 102b . . . 102n from MTJ elements 96a, 96b . . . 96n are connected to ground.

As shown for example in FIG. 5, the values "1" or "0" in connection with transistors 84a, 84b . . . 84n and transistors 98a, 98b . . . 98n indicate whether the transistor is "on" (meaning that voltage is being received via bus 92 or bus 108 from amplifier 94 or "off" (meaning that voltage is not being received via bus 92 or bus 108 from amplifier 94). Thus for example and as shown in FIG. 5, transistor 84b and transistor 98b are "on" and receiving a designated voltage from amplifier 94 respectively from bus 92 and bus 108 (and respectively from input 90b and input 104b, while transistors 84a . . . 84n and transistors 98a . . . 98n other than transistor 84b and transistor 98b are "off". Amplifier 94 generates a reference value from each reference MTJ element 96a, 96b . . . 96n that is respectively compared to electrical output from MTJ elements 82a, 82b . . . 82n.

Data output from MTJ element 82b and MTJ reference element 96b can be received by amplifier 94 via respective bus 92 and bus 108 and processed by amplifier 94 to generate a value of "0", "1" or "indeterminant" for MTJ element 82b compared to reference MTJ element 96b. Amplifier 62 is thus configured to compare voltage and/or current through a MTJ element being analyzed or sensed against a given reference MTJ element and then assign a value of "0", "1" or "indeterminant" compared to a reference MTJ element. The process can be repeated sequentially for some or all of the MTJ elements in the array.

More specifically, differential switching as shown in FIG. 5 allows resistance data for an array of bits or MTJ elements (e.g., 3 shown in FIG. 5) to be collected and analyzed on an individual basis. In other words, by controlling transistors 84a, 84b . . . 84n, each MTJ element can be analyzed individually compared to resistance data from a respective reference MTJ element. Output from the MTJ element being sensed and output from the reference MTJ element can be used in amplifier 94 to generate a fingerprint for the entire MTJ array. More specifically, the differential sensing arrangement represented in FIG. 5 allows for the generation of a string of data for a portion or all of a device such as a MRAM device by sequentially characterizing each MTJ element in an array.

As discussed above in connection with single ended sensing, all of the MTJ elements in an entire device (e.g. MRAM device, such as MRAM device 44 shown in FIG. 3) do not necessarily need to be analyzed or sensed to generate a fingerprint for the device. While not to be construed as limiting, a 1 MB device could have 1000 bit analyzed or sensed to generate and store a chip identification or chip fingerprint. The size of the MTJ array that is to be used to generate the fingerprint can be designed depending on the size of the device, the application and the like. For example, it could be desirable for a device requiring enhanced identification for security purposes to have a larger fingerprint or chip identification. In such case, the array that is analyzed could be larger than an array not requiring such identification and/or security.

The values of "0", "1" and "indeterminant" can be determined in various ways as discussed above in connection with single ended sensing. For example, if the output for a given MTJ element has a value greater than the reference MTJ element value, the sensed MTJ element can have a value of "1" assigned to it. In this scenario, if the output for a given MTJ element has a value less than the reference MTJ element value, the sensed MTJ element can have a value of "0" assigned to it. If the value of the sensed MTJ element is within a predetermined range of the reference MTJ element value, then the sensed MTJ element can have a value of "indeterminant" assigned to it. Alternatively, if the output for a given MTJ element has a value greater than the reference MTJ element value, the MTJ element can have a value of "0" assigned to it. In this scenario, if the output for a given MTJ element has a value less than the reference MTJ element value, the MTJ element can have a value of "1" assigned to it. If the value of the MTJ element is within a predetermined range of the reference MTJ element value, then the MTJ element can have a value of "indeterminant" assigned to it. The predetermined range in either case can be referred to as a "noise range". The noise range can be determined depending on the application, the array being tested and the like. While not to be construed as limiting and for purposes of illustration, a reference value could be 1000 ohms and a noise range could be +/−10 ohms. If the MTJ element thus has a value of 990-1010 ohms, the MTJ element could be assigned a value "indeterminant".

It will be appreciated that the reference data can be selected based on the application and is not limited to 1000 ohms. The resistance data of the MTJ elements in an array thus form a unique fingerprint for the array. The resistance of the array can be recorded and used as a permanent string. The permanent string can then be accessed and read at a subsequent time, making the pattern (i.e., fingerprint) reproducible in the sense that different readouts conducted on the same chip produce the same pattern.

Regardless of the type of sense circuitry employed, the data of the sensed MTJ elements in an array are collected in the amplifier and the amplifier can output all of the values in the array to generate raw data (such as shown for example in FIGS. 6 and 7) and generate a unique bit pattern or fingerprint. This unique bit pattern can be communicated from amplifier 62 or amplifier 94 to controller 100 for storage as a permanent string or identification of a chip. Controller 100 thus allows a server (not shown) to store the unique permanent string or fingerprint for a given array of MTJ elements, and thus for a given chip, for later identification and/or authentication.

Figure 6:
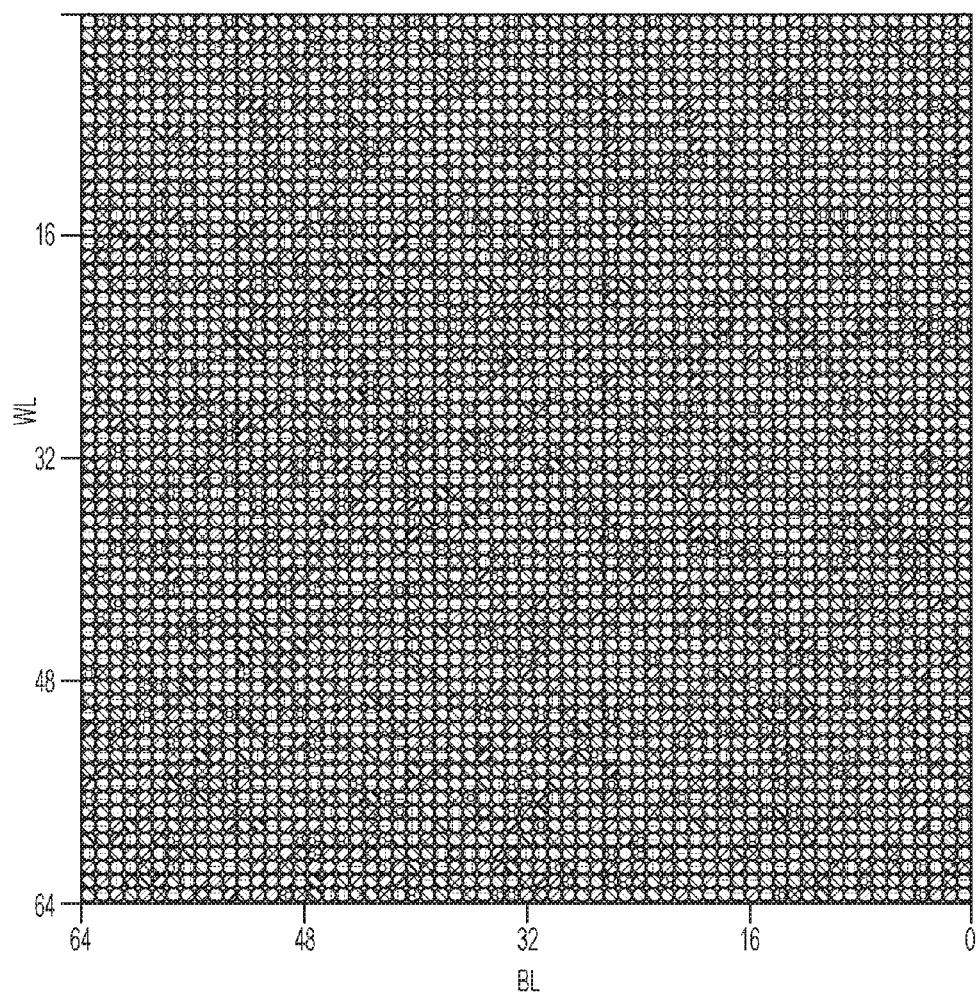
FIG. 6 illustrates a 4K array (64×64) of MTJ resistance data that forms a unique pattern for a given chip (i.e. a fingerprint)
Figure 7:
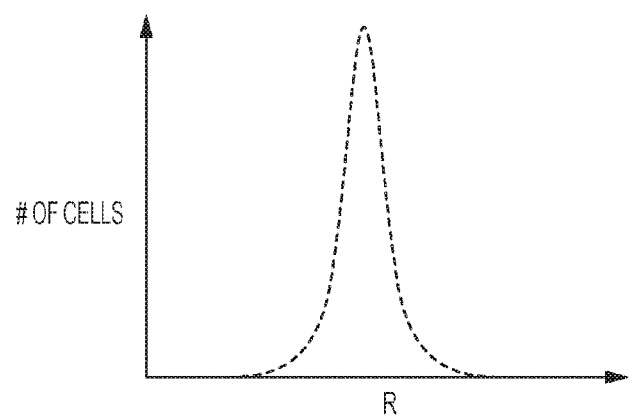
FIG. 7 shows a graph of resistance (R) vs. number of cells.

The recordation of the resistance data can include data recorded as bit line (BL) vs. width line (WL) information as shown in FIG. 6. For example and with reference to FIG. 6, a 64 MB array is shown to reveal a unique fingerprint for the array. More specifically, FIG. 6 shows a 4K array (64×64) of MTJ element resistance data illustrated as bit line (BL) vs. width line (WL) data. As can be seen and appreciated, the data forms a unique pattern for a given chip (i.e. a fingerprint). The pattern is unique to the chip; one array and the next do not have the same pattern or fingerprint. As mentioned above, FIG. 6 illustrates an exemplary fingerprint or raw resistance data. Color variations can depict the values assigned to a MTJ element of "0", "1" and "indeterminant". For example, certain color ranges can be used for values of "0" while other colors can be used for values of "1" and still other colors can be used for "indeterminant" values. In addition or alternatively, the MTJ element data can be permanently stored as resistance distribution data. FIG. 7 shows resistance distribution based on resistance (R) vs. the number of cells to demonstrate MTJ element resistance distributions. The resistance element distribution data can also be stored and used for later identification, authentication and security purposes.

The stored permanent string or fingerprint can be used in a variety of ways, for example for purposes of identification and/or authentication. For example and for illustrative purposes, the permanent string can be stored in a server or the like. An identification process could therefore include powering up a device and reading every MTJ element on that device to assess values and read strings associated with the device. A server can then be contacted to verify if the strings that have been read match the stored fingerprint (i.e., permanent string). If a match is made, then the chip has been identified and possibly authenticated, depending on the source of the chip. Conversely, if a match is not made, the chip has not been properly identified and/or may not be authenticated.

The arrangements of the present invention thus allow for chips having a memory device such as a MRAM device to have a unique identification or fingerprint based on an array of MTJ elements in the device and allowing access to the chip identification area. Such identification and access allow for authentication and improved security of chips in use.

In some embodiments of the present invention, a mask or secret key can be created for an enhanced fingerprint. This may be desirable for making the chip identification process more difficult, thereby enhancing identification and/or security protection of the chip. Such a mask or secret key may be created through the use of an oxygen treatment that is used on part or all of an array that is being used to generate a fingerprint.

Figure 8:
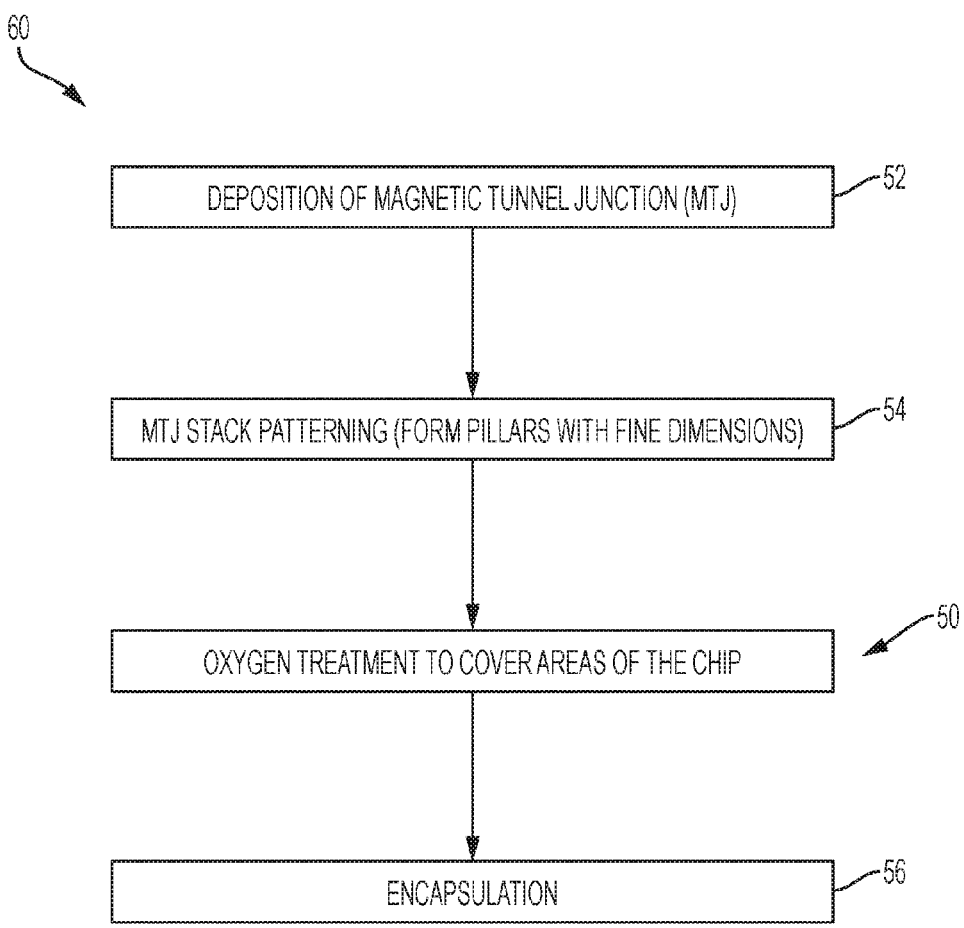
FIG. 8 shows a flow diagram that includes oxygen treatment to areas of the chip.

Referring now to FIG. 8, a process flow diagram including an oxygen treatment in accordance with the present invention is illustrated. As mentioned hereinabove, the present invention is designed to be applicable to any MTJ element and array of MTJ elements. Accordingly, details of the manufacturing process of a particular MTJ element are not provided herein. Generally, however, a chip manufacturing process that includes MTJ elements is shown by flow process 60 shown in FIG. 8. Such process includes MTJ element stack deposition steps 52 for forming MTJ elements that include a magnetic layer (e.g., a ferromagnetic layer), an insulating layer and a second magnetic layer (e.g., a ferromagnetic layer) as discussed above in connection with FIG. 1. MTJ element stack patterning steps are included to form pillars of fine dimensions, represented by step 54 in process 60. In some embodiments of the present invention, an optional oxygen treatment 50 can be included to cover part or all areas of the chip. More specifically, oxygen treatment in accordance with the present invention can include oxygen treatment to selected areas of a chip. As discussed herein, it may be desirable to expose only portions of the chip to oxygen treatment 50. When an oxygen treatment process is used, it is performed prior to encapsulation process 56.

Figure 9:
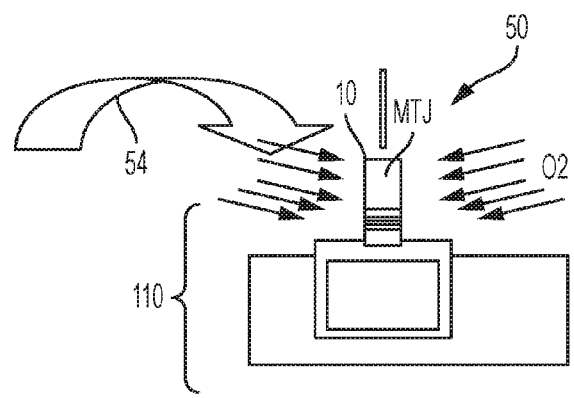
FIG. 9 depicts an illustrative oxygen (O₂) treatment of a portion of an integrated circuit (IC) chip in accordance with the present invention.

FIG. 9 illustrates oxygen treatment process 50 suitable for use in the present invention. Oxygen treatment process 50 can be used to generate a mask for the chip fingerprint by altering the resistance pattern of the MTJ element. As can be seen from FIG. 9, chip 110 includes MTJ element 10 as discussed above. Oxygen treatment process 50 can be performed at the end of MTJ stack patterning process 54, but prior to encapsulation process 56. As can be seen from FIG. 9, a portion of chip 110 that includes MTJ element 10 (rather than the entire chip) can be exposed to oxygen treatment 50. As mentioned above, oxygen treatment in accordance with the present invention can include oxygen treatment to selected areas of a chip. Some or all MTJ elements in an array may be subjected to oxygen treatment.

Oxygen treatment process 50 includes exposing the outer walls of the MTJ element such that granularity in the MTJ is amplified, thereby changing the resistance of the MTJ element. Oxygen treatment process 50 can include an oxygen plasma treatment that includes the use of the partial pressure of oxygen and a plasma source to expose the outer walls of the MTJ element such that granularity in the MTJ is amplified. The details such as oxygen pressure, temperature and the like can vary depending on the desired application and the amount of oxygen treatment desired.

Figure 11:
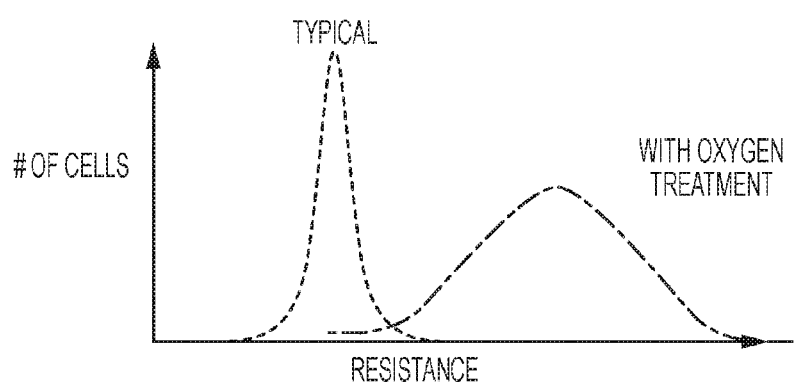
FIG. 11 shows a plot of resistance (R) vs. number of cells demonstrating typical MTJ distributions and MTJ distributions that have been subjected to O₂ treatment.

The resistance of the MTJ element can accordingly be increased or decreased by using such an oxygen treatment, thereby changing the resistance profile distribution of the MTJ element (see e.g., FIG. 11). The degree to which the oxygen process can vary depends on the application and the desired effect on the resistance profile of the MTJ element. If the MTJ element is exposed to too much oxygen treatment, there can be too much variance introduced into the resistance profile of the MTJ element. If, on the other hand, the MTJ element is exposed to insufficient oxygen treatment, there may not be sufficient or desired alteration in the resistance profile to distinguish from a MTJ element that has not been subjected to oxygen treatment. In some embodiments, it can be desirable to use the oxygen treatment 50 on only a portion of the chip rather than on the entire chip to generate a mask or alteration of the chip fingerprint.

Given that the amount of oxygen treatment can affect the resistance profile of the MTJ element, the oxygen treatment can be used to alter the fingerprint of the MTJ element, and make the fingerprint even more unique. Consequently, the oxygen treatment can be used to enhance the chip identification and/or authentication of the chip (i.e. enhance the security of the chip by making it more difficult to identify and thereby facilitating the authentication of the chip).

Figure 10A:
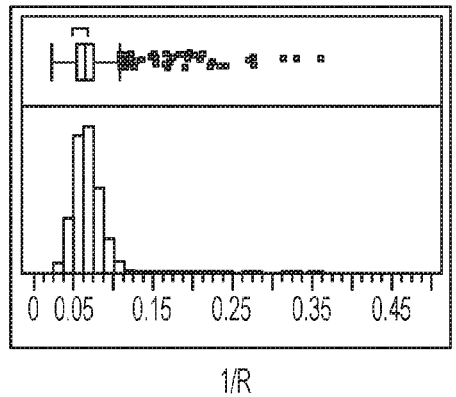
FIG. 10A shows evaluation of a MRAM device without oxygen (O₂) treatment.
Figure 10B:
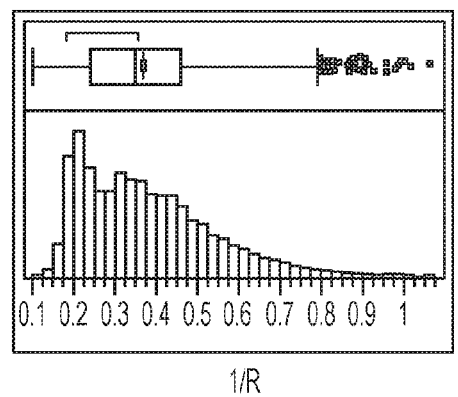
FIG. 10B shows evaluation of a MRAM device with oxygen (O₂) treatment.

FIGS. 10A and 10B illustrate treatment on a portion of a MRAM lot.

More specifically, FIG. 10A shows evaluation of a portion of a MRAM lot that was not subjected to oxygen treatment (i.e., had no oxygen treatment) while FIG. 10B shows evaluation of a portion of a MRAM lot that was subjected to oxygen treatment in accordance with the present invention. As can be appreciated from the figures, the MTJ resistance distributions (in this case the $R_{minimum}$) were wider when oxygen treatment was used. Such treatment can therefore be used to enhance the robustness of the chip identification process of the present invention. It will be appreciated that values of either minimum resistance ($R_{minimum}$) or maximum resistance ($R_{maximum}$) can be used to generate relevant data and information.

Referring now to FIG. 11, it can be seen that the resistance profile of an array of MTJ elements can be altered with the oxygen treatment of the present invention. FIG. 11 illustrates a resistance profile for a typical array of MTJ elements not subjected to the oxygen treatment of the present invention and a possible resistance profile of an array of MTJ elements subjected to the oxygen treatment of the present invention for purposes of comparison. Consideration for the use of the oxygen treatment and the degree of such use can include that the functionality of the chip can be affected if too much oxygen treatment is used. Generally speaking, a tighter or more narrow resistance distribution can be beneficial for the functionality of an array of MTJ elements. This consideration can be balanced with the desired enhanced uniqueness of the mask generated for chip identification purposes for a given application.

The various arrangements can be manufactured in accordance with the teachings provided herein. For example, one skilled in the art can use the disclosure and teachings provided herein to determine the type of sensing desired and manufacture the appropriate circuitry.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An array of magnetic tunnel junction elements configured for chip identification, the array comprising:
    a plurality of magnetic tunnel junction elements, each magnetic tunnel junction element comprising a first magnetic layer, a second magnetic layer and a non-magnetic layer positioned between the first and second magnetic layers; and
    sense circuitry electrically connected to the plurality of magnetic tunnel junction elements, the sense circuitry configured to generate resistance data for the plurality of magnetic tunnel junction elements relative to reference data, wherein the sense circuitry is configured to provide a fingerprint data comprising a permanent string element for the array of magnetic tunnel junction elements.

2. The magnetic tunnel junction array of claim 1, wherein the sense circuitry comprises single ended sensing sense circuitry configured to sense resistance data for the plurality of magnetic tunnel junction elements relative to a plurality of reference values respectively corresponding to the resistance data of the plurality of magnetic tunnel junction elements.

3. The magnetic tunnel junction array of claim 2, wherein the single ended sensing sense circuitry comprises a plurality of transistors, the plurality of transistors arranged such that a transistor is electrically connected to each of the plurality of magnetic tunnel junction elements and configured to provide the resistance data of the respective magnetic tunnel junction element for comparison to the respective reference value.

4. The magnetic tunnel junction array of claim 3, wherein the plurality of the transistors are electrically connected to an amplifier.

5. The magnetic tunnel junction array of claim 4, wherein the amplifier is a digital amplifier configured to assign a value of 1, 0 or indeterminant for each of the magnetic tunnel junction elements that is sensed.

6. The magnetic tunnel junction array of claim 5, wherein the assigned values of the plurality of magnetic tunnel junction elements comprise a permanent string of data for the magnetic tunnel junction array.

7. The magnetic tunnel junction array of claim 1, wherein the array is part of a magnetoresistive random access memory (MUM) device.

8. The magnetic tunnel junction array of claim 1, wherein the sense circuitry comprises differential sensing sense circuitry configured to sense resistance data of the plurality of magnetic tunnel junction elements relative to a plurality of reference magnetic tunnel junction element values.

9. The magnetic tunnel junction array of claim 8, wherein the differential sensing sense circuitry comprises:
    a plurality of transistors, the plurality of transistors arranged such that a transistor is electrically connected to each of the plurality of magnetic tunnel junction elements;
    a plurality of reference transistors; and
    a plurality of reference magnetic tunnel junction elements, a reference transistor electrically connected to each of the plurality of reference MTJ elements and configured to generate a reference magnetic tunnel junction value for each of the plurality of the reference magnetic tunnel junction elements relative to each of the magnetic tunnel junction elements that is sensed.

10. The magnetic tunnel junction array of claim 9, wherein the plurality of the transistors are electrically connected to an amplifier.

11. The magnetic tunnel junction array of claim 10, wherein the amplifier is a digital amplifier configured to assign a value of 1, 0 or indeterminant for each of the magnetic tunnel junction elements.

12. The magnetic tunnel junction array of claim 11, wherein the assigned values of the plurality of magnetic tunnel junction elements comprise a permanent string of data for the magnetic tunnel junction array.

* * * * *